(12) United States Patent
Storm

(10) Patent No.: US 12,471,840 B2
(45) Date of Patent: Nov. 18, 2025

(54) METHOD AND APPARATUS FOR ESTABLISHING ABSENCE OF PAIN IN A MAMMAL

(71) Applicant: Med Storm Innovation AS, Oslo (NO)

(72) Inventor: Hanne Storm, Oslo (NO)

(73) Assignee: MED STORM INNOVATION AS, Oslo (NO)

( * ) Notice: Subject to any disclaimer, the term of this patent is extended or adjusted under 35 U.S.C. 154(b) by 745 days.

(21) Appl. No.: 17/777,057

(22) PCT Filed: Oct. 28, 2020

(86) PCT No.: PCT/EP2020/080298
§ 371 (c)(1),
(2) Date: May 16, 2022

(87) PCT Pub. No.: WO2021/099083
PCT Pub. Date: May 27, 2021

(65) Prior Publication Data
US 2022/0401020 A1    Dec. 22, 2022

(30) Foreign Application Priority Data
Nov. 18, 2019   (NO) .................................. 20191365

(51) Int. Cl.
*A61B 5/00*     (2006.01)
*A61B 5/0531*   (2021.01)

(52) U.S. Cl.
CPC .......... *A61B 5/4824* (2013.01); *A61B 5/0531* (2013.01); *A61B 5/7221* (2013.01); *A61B 5/7246* (2013.01); *A61B 5/6825* (2013.01); *A61B 5/6829* (2013.01); *A61B 2503/40* (2013.01)

(58) Field of Classification Search
CPC ... A61B 5/4824; A61B 5/0531; A61B 5/7221; A61B 5/7246; A61B 5/6825;
(Continued)

(56) References Cited

U.S. PATENT DOCUMENTS 7,407,485 B2 * 8/2008 Huiku .................. A61B 5/4035
                                                    600/300
2008/0319337 A1 * 12/2008 Storm .................. A61B 5/4824
                                                    600/547
(Continued)

FOREIGN PATENT DOCUMENTS

NO            329287 B1    9/2010
WO    WO00/72751 A1    12/2000
(Continued)

OTHER PUBLICATIONS

Changes in skin conductance as a tool to monitor nociceptive stimulation and pain. pp. 796-804 XP055755830.
(Continued)

*Primary Examiner* — Eric F Winakur
*Assistant Examiner* — Sienna C Pyle
(74) *Attorney, Agent, or Firm* — Christian D. Abel

(57) ABSTRACT

A method and an apparatus for establishing absence of pain in a human or other mammal have been disclosed. The method comprises the steps of providing a skin conductance signal measured at an area of the mammal's skin through a time interval; detecting peaks in the skin conductance signal through said time interval; determining a rate of the peaks through the time interval; comparing the determined rate of peaks with a predetermined reference value; and if the measured rate of peaks is lower than the predetermined reference value, providing an output signal as indicating the state of absence of pain in the mammal.

10 Claims, 2 Drawing Sheets

(58) Field of Classification Search
CPC . A61B 5/6829; A61B 2503/40; A61B 5/0533; A61B 5/053; A61B 5/16
See application file for complete search history.

(56) References Cited

U.S. PATENT DOCUMENTS

2009/0229171 A9* 9/2009 Storm .................. A61B 5/4824
44/250
2017/0135631 A1* 5/2017 Zuckerman-Stark ........................
A61B 5/4824

FOREIGN PATENT DOCUMENTS

WO     WO03/094726 A1     11/2003
WO     WO2007097634-X     8/2007

OTHER PUBLICATIONS

Skin conductance as a measure of pain and stress in hospitalised infants. Early Hum Dev. 2006, vol. 82, No. 9, p. 603-608.
Physiological Signal-Based Method for Measurement of Pain Intensity. Front Neurosci. 2017; vol. 11, No. 279, p. 1-13.
T. Ledowski, "The assessment of postoperative pain by monitoring skin conductance: results of a prospective study", Anaesthesia 2007; 62:989-993.
PCT/EP2020/080298 ISR & Written Opinion dated Dec. 17, 2020.
PCT/EP2020/080298 International Preliminary Examination report dated May 20, 2021.
PCT/EP2020/080298 Written Opinion from IPEA dated Feb. 18, 2021.

* cited by examiner

METHOD AND APPARATUS FOR ESTABLISHING ABSENCE OF PAIN IN A MAMMAL

TECHNICAL FIELD

The invention relates in general to a method and an apparatus for establishing absence of pain in a mammal.

BACKGROUND OF THE INVENTION

Methods and apparatus exist in the art for monitoring the nervous system of humans and other mammals, in particular for detecting pain in unconscious, non-verbal patients, e.g. patients in anaesthesia or artificially ventilated patients during surgery. Some of these methods and apparatus are used to determine if the patient needs medication due to the determined pain state in the patient.

There is a need for a method and apparatus for establishing absence of pain in a mammal, in all groups from conscious and presumably healthy to the hospitalized humans or other mammals.

WO-00/72751 relates to an apparatus and a method for monitoring the autonomous nervous system in an individual, especially for detecting pain, by utilizing spontaneous change in skin conductance. The apparatus comprises measuring equipment for measuring the skin's conductance, and storage and processing means for deriving secondary characteristics of the conductance signal. Pain in the patient may be indicated based on amplitude and frequency of fluctuations in the skin conductance signal.

SUMMARY OF THE INVENTION

An object of the present invention is to provide a method and an apparatus for establishing absence of pain in a mammal.

According to the invention, the above objects are achieved by a method and an apparatus as defined in the appended independent claims.

Further advantages and characteristics of the invention are indicated in the dependent claims.

BRIEF DESCRIPTION OF THE DRAWINGS

The invention will be described by example with reference to the drawings, wherein.

DETAILED DESCRIPTION OF THE INVENTION

Figure 1:
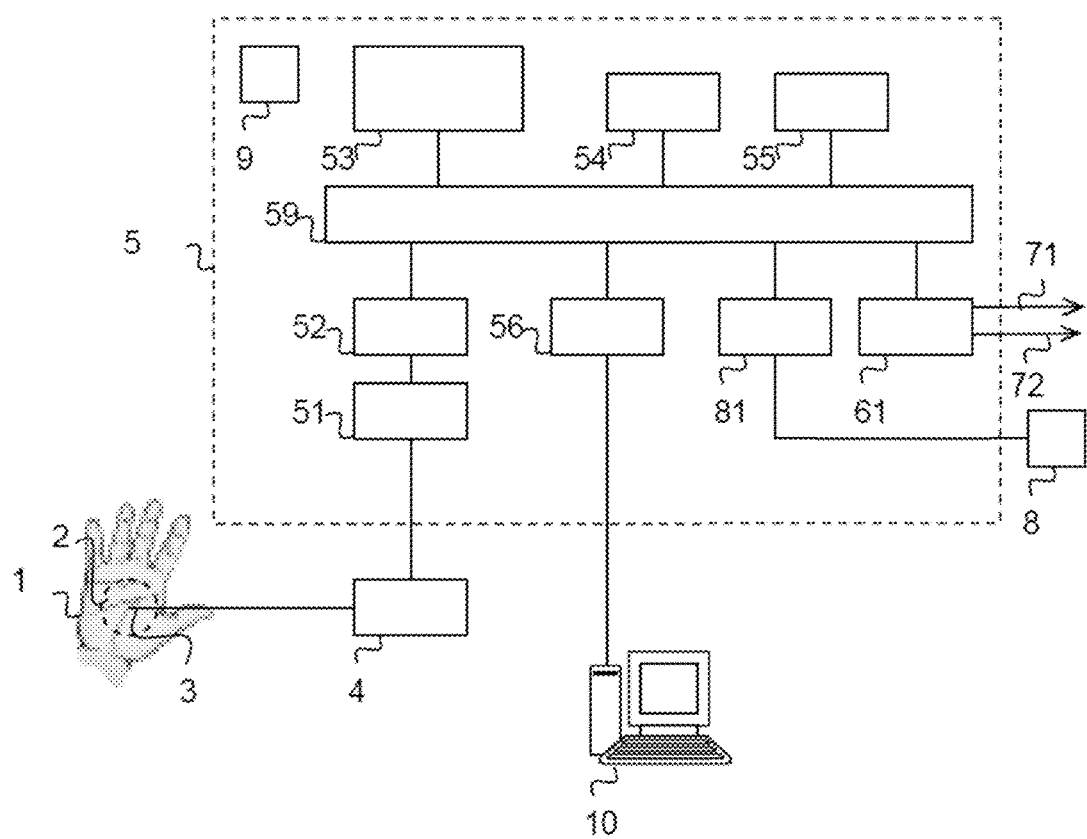
FIG. 1 is a schematic block diagram illustrating principles of an apparatus for establishing absence of pain in a mammal.

FIG. 1 is a schematic block diagram illustrating principles of an apparatus for establishing absence of pain in a human or other mammal, in all groups from particular a conscious and presumably healthy to the hospitalized humans or other mammals.

On an area 2 of the skin on a body part 1 of the human or other mammal, sensor means 3 are placed for measuring the skin's conductance. In the case of a human, the body part 1 is preferably a hand or a foot, and the area 2 of the skin on the body part 1 is preferably the palmar side of the hand (in the palm of the hand) or the plantar side of the foot (under the sole of the foot). In the case of a non-human mammal, in particular a mammal having paws, the area of the body part may be the palmar side of a paw. The sensor means 3 comprise contact electrodes where at least one electrode (the measuring electrode) is placed on the skin area 2. In a preferred embodiment the sensor means 3 consist of three electrodes: a signal electrode, a measuring electrode and a reference voltage electrode, which ensures a constant application of voltage over the stratum corneum (the surface layer of the skin) under the measuring electrode. The measuring electrode and the signal electrode are preferably placed on the skin area 2. The reference voltage electrode may also be placed on the skin area 2, but it is preferably placed in a nearby location, suitable for the measuring arrangement concerned.

In a preferred embodiment an alternating current is used for measuring the skin's conductance. The alternating current advantageously has a frequency in the range of up to 1000 Hz, corresponding to the area where the skin's conductance is approximately linear. A frequency should be selected which ensures that the measuring signal is influenced to the least possible extent by interference from, e.g., the mains frequency. In a preferred embodiment the frequency is 88 Hz. A signal generator, operating at the specified frequency, applies a signal current to the signal electrode.

In the case of alternating current the conductance is identical to the real part of the complex admittance, and therefore not necessarily identical with the inverse value of the resistance. An advantage of using alternating current instead of direct current in conductance measurement is that by this means one avoids the invidious effect on the measurements of the skin's electrical polarizing properties.

The resulting current through the measuring electrode is conveyed to a measurement converter 4. This comprises a current to voltage converter, which in a preferred embodiment is a trans resistance amplifier, but in its simplest form may be a resistance, which converts the current from the measuring electrode to a voltage.

The measurement converter further comprises a decomposition circuit, preferably in the form of a synchronous rectifier, which decomposes the complex admittance in a real part (the conductance) and an imaginary part (the susceptance). However, it is sufficient if the decomposition circuit only comprises means for deriving the conductance. The synchronous rectifier multiplies the measured voltage with the voltage from the signal generator. The two signals are in-phase. After multiplication, the result is according to the cosine ($2u$) equation, where the result is a DC component and one component at $2u$ frequency. In the preferred embodiment, this becomes 176 Hz. In the preferred embodiment, this synchronous rectifier is realized as an analog circuit with the required accuracy.

The measurement converter 4 may also comprise amplifier and filter circuits. In the preferred embodiment the measurement converter contains low-pass filters, both at the input and at the output. The object of the input low-pass filter is to attenuate high-frequency noise, for instance coming from other medical equipments, and also to serve as anti-aliasing filter to prevent high frequency components from being received by subsequent circuits for time discretization. The output low-pass filter shall attenuate the $2u$ components that result from the multiplication operation in the synchronous rectifier so that only the signal near DC is used for further processing.

By means of the choice of components and design details, moreover, the measurement converter is designed with a view to obtaining high sensitivity and a low noise level.

Although the measurement converter 4 has been illustrated to be external to the control unit 5 by example, it should be understood that the measurement converter may be included in the control unit 5.

The control unit 5 comprises a time discretization unit 51 for time discretization of the signal from the measurement converter. The time discretization takes place at a sampling rate, which may advantageously be in the order of 20 to 200 samplings per second. The control unit further comprises an analog-digital converter 52, which converts measurement data to digital form. The choice of circuits for time discretization and analog-digital conversion implies technical decisions suitable for a person skilled in the art. In the preferred embodiment, time discretization is done in an integrated circuit, which combines oversampling, filtering and discretization.

The control unit may advantageously comprise additional analog and possibly also digital inputs (not illustrated), in addition to the input from the measurement converter 4. In this case the control unit 5 can either be equipped with a plurality of analog-digital converters 52, or it can employ various multiplexing techniques well-known to those skilled in the art in order to increase the number of analog inputs. These additional analog inputs may, for example, be arranged for additional electrodermal measurements, or for other physiological measurements which may advantageously be performed simultaneously or parallel with the electrodermal measurement, such as temperature, pulse, ECG, respiratory measurements, oxygen saturation measurements in the blood, or EEG (bispectral index).

The control unit 5 also comprises a processing unit 53 for processing the digitized measurement data, storage means in the form of at least one store for storing data and programs, illustrated as a non-volatile memory 54 and a random access memory 55. The control unit 5 further comprises an interface circuit 61, which provides a first output signal 71 and optionally a second output signal 72. Optionally, the control unit 5 further comprises a further interface circuit 81, which is further connected to display unit 8. The control unit 5 may also optionally comprise a wireless communication adapter or a communication port 56 for digital communication with an external unit 10, such as a personal computer, a tablet, a mobile terminal or a smart telephone. Such communication is well-suited for loading or altering the program which is kept stored in the memory 54, 55 in the control unit, or for adding or altering other data which are kept stored in the memory 54, 55 in the control unit. Such communication is also well suited for read-out of data from the memory 54, 55 in the apparatus, thus enabling them to be transferred to the external unit 10 for further, subsequent analysis or storage.

In a preferred embodiment the non-volatile memory 54 comprises a read-only storage in the form of programmable ROM circuits, containing at least a program code and permanent data, and the random access memory 55 comprises a read and write storage in the form of RAM circuits, for storage of measurement data and other provisional data.

The control unit 5 also comprises an oscillator (not shown), which delivers a clock signal for controlling the processing unit 53. The processing unit 53 also contains timing means (not shown) in order to provide an expression of the current time, for use in the analysis of the measurements. Such timing means are well-known to those skilled in the art, and are often included in microcontrollers or processor systems which the skilled person will find suitable for use with the present invention.

The control unit 5 may be realized as a microprocessor-based unit with connected input, output, memory and other peripheral circuits, or it may be realized as a micro controller unit where some or all of the connected circuits are integrated. The time discretization unit 51 and/or analog-digital converter 52 may also be included in such a unit. The choice of a suitable form of control unit 5 involves decisions, which are suitable for a person skilled in the art.

An alternative solution is to realize the control unit 5 as a digital signal processor (DSP).

The control unit 5 is arranged to read time-discrete and quantized measurements for the skin conductance from the measurement converter 4, preferably by means of an executable program code, which is stored in the non-volatile memory 54 and which is executed by the processing unit 53. It is further arranged to enable measurements to be stored in the read and write memory 55. By means of the program code, the control unit 5 is further arranged to analyze the measurements in real time, i.e. simultaneously or parallel with the performance of the measurements. In this context, simultaneously or parallel should be understood to mean simultaneously or parallel for practical purposes, viewed in connection with the time constants which are in the nature of the measurements. This means that input, storage and analysis can be undertaken in separate time intervals, but in this case these time intervals, and the time between them, are so short that the individual actions appear to occur concurrently.

The control unit 5 is further arranged to detecting fluctuation peaks in the time-discrete, quantized measuring signal, by means of a program code portion which is stored in the non-volatile memory 54 and which is executed by the processing unit 53.

The control unit 5 is further arranged to determining the rate of the fluctuation peaks in the time-discrete, quantized measuring signal through a time interval, by means of a program code portion which is stored in the non-volatile memory 54 and which is executed by the processing unit 53.

The control unit 5 is further arranged to comparing the determined rate of peaks with a predetermined reference value, by means of a program code portion which is stored in the non-volatile memory 54 and which is executed by the processing unit 53.

The control unit 5 is further arranged to, if the measured rate of peaks is lower than the predetermined reference value, to provide a first output signal 71 of an interface circuit 61, as indicating the state of absence of pain in the human or other mammal, by means of a program code portion which is stored in the non-volatile memory 54 and which is executed by the processing unit 53.

The control unit 5 may further be arranged to perform various steps and combinations of steps of the method as disclosed herein, in particular with reference to FIG. 3 below, by means of a program code portion which is stored in the non-volatile memory 54 and which is executed by the processing unit 53.

The processing unit 53, the memories 54, 55, the analog/digital converter 52, the communication port 56, the interface circuit 81 and the interface circuit 61 are all connected to a bus unit 59. The detailed construction of such bus architecture for the design of a microprocessor-based instrument is regarded as well-known for a person skilled in the art.

The interface circuit 61 is a digital port circuit, which derives at least a first digital output signal 71, from the processing unit 53 via the bus unit 59 when the interface circuit 61 is addressed by the program code executed by the processing unit 53.

The first digital output signal 71 indicates that the analysis of the skin conductance measurement has established the state of absence of pain in the human or other mammal.

Additional output signals, schematically illustrated as a second output signal 72, may also be provided by the interface circuit 61.

In a preferred embodiment the display means 8 consist of a screen for graphic visualization of the conductance signal, and a digital display for displaying the frequency and amplitude of the measured signal fluctuations. The display units are preferably of a type whose power consumption is low, such as an LCD screen and LCD display. The display means may be separate or integrated in one and the same unit.

The apparatus further comprises a power supply unit 9 for supplying operating power to the various parts of the apparatus. The power supply may include a battery, preferably a rechargeable battery, or alternatively a connection to an external power supply such as a mains supply.

Figure 2:
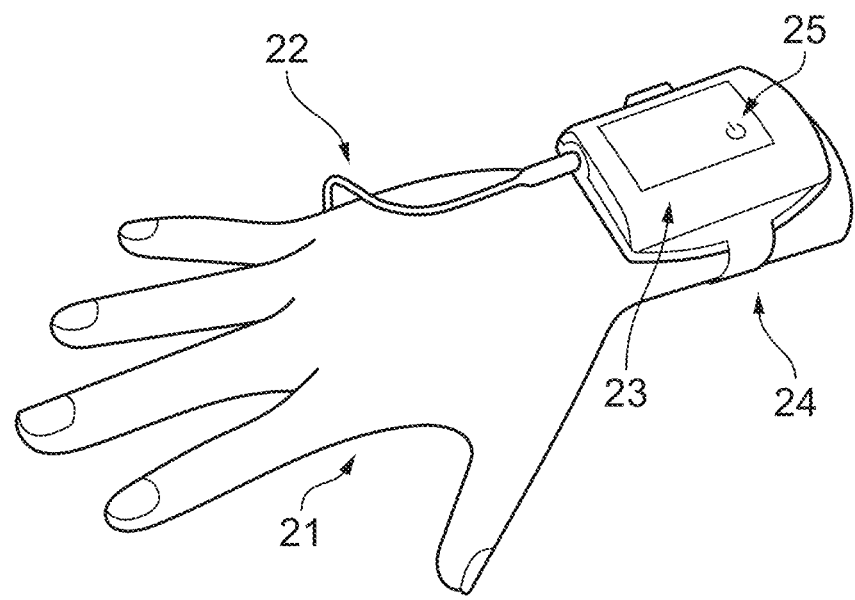
FIG. 2 is a perspective view illustrating an apparatus for establishing absence of pain in a mammal, during use.

FIG. 2 is a perspective view illustrating an apparatus for establishing absence of pain in a mammal, during use.

Electrodes, typically three electrodes as described above with reference to the disclosure of FIG. 1, are placed on the palmar side of a hand 21 of a human, hence the electrodes are not visible on FIG. 2. In case of a mammal having paws, the electrodes are placed on the palmar side of a paw. The electrodes are interconnected by a cable 22 to an apparatus 23 for establishing absence of pain in the mammal. The apparatus 23 includes a housing which encapsulates electronics that embodies the measurement converter 4 and the control unit 5 as described above with reference to FIG. 2. The housing of the apparatus is strapped to the wrist of the human or other mammal by means of a suitable wrist strap 24, preferably made of an elastic material. The apparatus 23 includes a simple operational interface including an operational element 25 that may be a touch button for switching the apparatus on and off. The apparatus 23 also includes an indicator, that may be an optical or audible indicator, or both, that provides an optical or audible indication corresponding to the first output signal 71, indicating the state of absence of pain in the mammal. Further operation of the apparatus may be provided by means of an external terminal, such as a smart telephone, corresponding to the external unit 10 and enabled to communicate with the control unit 5 in the apparatus 23 as described above with reference to FIG. 1.

Figure 3:
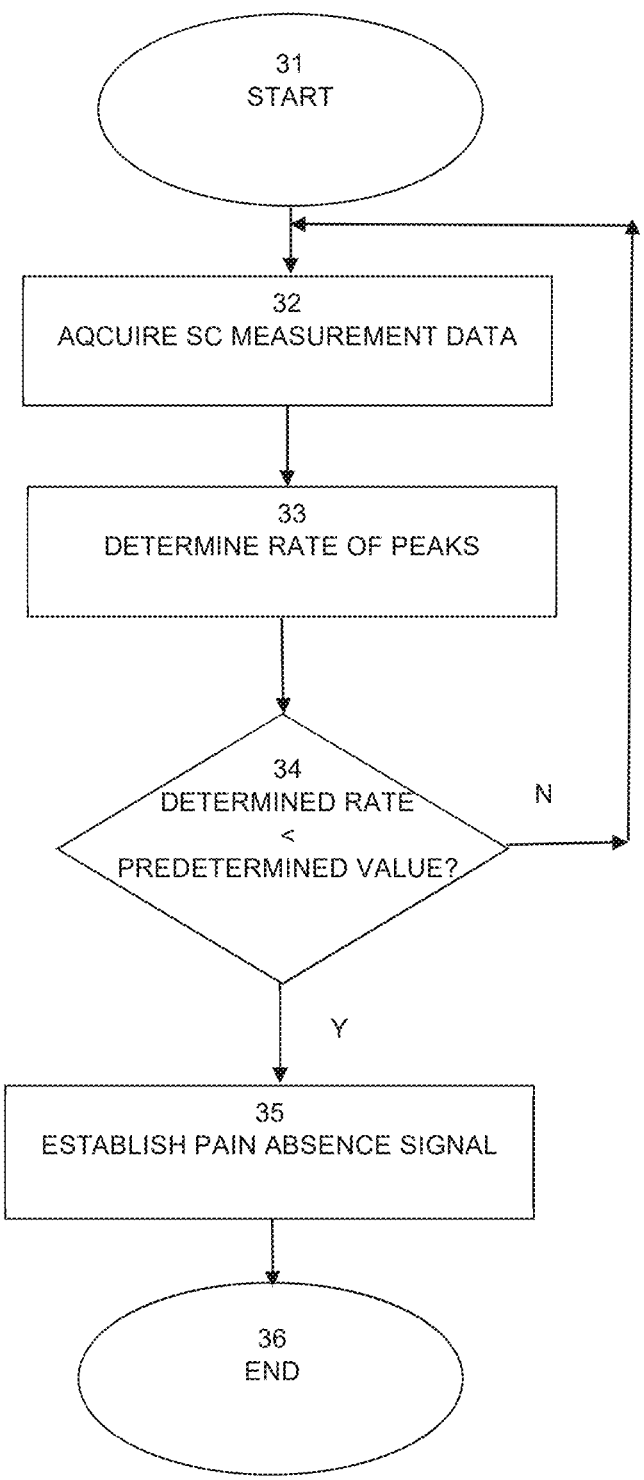
FIG. 3 is a flow chart illustrating a method for establishing absence of pain in a mammal.

FIG. 3 is a flow chart illustrating a method for establishing absence of pain in a human or other mammal.

The method starts at reference 31.

In measurement step 32, a skin conductance signal measured at an area of the human's or mammal's skin through a time interval is provided. To this end, skin conductance signal or EDR (electrodermal response) signal is measured by means of sensor means 3 such as contact electrodes, arranged on a body part 1 of the human or other mammal, preferably the palmar side of a hand or paw, as already has been explained with reference to FIGS. 1 and 2 above.

The skin conductance, preferably in microsiemens (uS), is time-quantized and converted to digital form, for instance by the use of equipment described with reference to FIG. 1 above. A time-series of a certain duration, typically between 5 seconds and 60 seconds, and more preferably between 15 and 45 seconds, still more preferably between 25 and 35 seconds, containing skin conductance data, is acquired during step 32. For instance, at 15 seconds, with a sampling rate of 20-200 samples per second, the time-series may contain 300-3000 samples.

In the subsequent peaks rate determining step 33, peaks in the skin conductance signal are detected through said time interval, and a rate of the peaks through the time interval is determined.

In the peak detecting substep of step 33, a test may be performed in order to detect the existence of valid peaks in the time-series of acquired skin conductance signal. If one or more peaks are detected, the rate of peaks is subsequently determined. If no peak is detected, the rate of peaks is considered to be zero.

The existence of a valid peak may be established if the derivative of the signal changes sign through a small period in the interval. The derivative of the signal may be calculated as the difference between two subsequent sample values. In addition, it is possible to use a simple digital filter that needs to see two or more subsequent sign changes before the sign change is accepted.

In the test step of establishing a valid peak it may be necessary to establish additional criteria for when a peak should be considered as valid. In their simplest form such criteria may be based on the fact that the signal amplitude has to exceed an absolute limit in order to be able to be considered a valid fluctuation. A recommended, such reference value for the conductance is between 0.005 µS and 0.03 µS, preferably 0.015 µS.

Alternatively or in addition, it may be advantageous to base the criteria on the fact that the signal actually has formed a peak that has lasted a certain time. The criteria may also be based on the fact that the increase in the skin conductance signal value as a function of time must remain below a certain limit, typically 20 µS/s, if the maximum value is to be considered valid.

Another possible condition for establishing a valid peak is that the absolute value of the change in the conductance signal from a local peak to the following local valley exceeds a predetermined value, such as between 0.01 µS and 0.02 µS, preferably 0.015 µS.

Also, a maximum value appearing at the border of the interval, i.e. the starting point or ending point of the interval should preferably not be regarded as a valid peak.

The object is thereby achieved that artifacts, which can occur in error situations such as, e.g., electrodes working loose from the skin, or other sources of noise or disturbances, does not lead to the erroneously detection of peaks.

In the comparison step 34, the determined rate of peaks is compared with a predetermined reference value.

The predetermined reference value is in the range of 0.00 to 0.12 peaks per second. Advantageously, the predetermined reference value may be in the range of 0.00 to 0.06 peaks per second. Still more advantageously, the predetermined reference value may be in the range of 0.00 to 0.03 peaks per second.

Advantageously, the output signal is provided as indicating the state of absence of pain in the mammal if, additionally, a mean rate of the peaks through the time interval has been determined to last for a certain time period, the time period being in the range 2 to 10 minutes, or in the range 3 to 6 minutes, or in the range of 4 to 5 minutes.

If the determined rate of peaks is lower than the predetermined reference value, the establishing step 35 is performed. In the establishing step 35, a first output signal 71 is provided as indicating the state of absence of pain in the mammal.

Otherwise, if in the comparison step 34 the determined rate of peaks equals or is greater than the predetermined reference value, the process continues at another iteration of the measurement step 32.

After the establishment of the pain absence signal in step 35, the process may end at the terminating step 36, or alternatively, it may be repeated by continuing at the measurement step 32.

The process may at any time be interrupted or terminated by an operating device (not shown) or by a command input from the communication port 56.

The disclosed method and apparatus results in a reliable establishment of absence of pain in a human or other mammal, in particular a conscious human or mammal as well as hospitalized humans or mammals. In case of a human, the human does not necessarily need to be a patient. In an aspect, the method and the apparatus may be a non-medical method and a non-medical apparatus. In an aspect, the method and apparatus may be particularly useful for providing confirmation of presumed absence of pain in a presumably substantially healthy human or in a human with a light disease especially treated in their homes. In an aspect, the method and apparatus may be particularly intended not to be used for the purpose of administering medicals to the human or mammal.

The invention claimed is:

1. Method for establishing absence of pain in a mammal, comprising the steps of
    providing a skin conductance signal measured at an area of the mammal's skin through a time interval;
    detecting peaks in the skin conductance signal through said time interval;
    determining a rate of the peaks through the time interval;
    comparing the determined rate of peaks with a predetermined reference range for rates of peaks in the skin conductance over time, wherein rates of peaks within the predetermined reference range are indicative of the absence of pain;
    if the measured rate of peaks is within the predetermined reference range, providing an output signal as indicating the state of absence of pain in the mammal; and
    wherein the predetermined reference range is 0.00 to 0.03 peaks per second.

2. Method according to claim 1,
    wherein the time interval is in the range 5 to 60 seconds.

3. Method according to claim 1,
    wherein the output signal is provided as indicating the state of absence of pain in the mammal if also a mean rate of the peaks through the time interval has been determined to last for a certain time period, the time period being in the range 2 to 10 minutes.

4. Method according to claim 1,
    wherein said step of detecting peaks in the skin conductance signal through said time interval comprises establishing the existence of a valid peak if the derivative of the skin conductance signal changes sign through a small period in the time interval.

5. Method according to claim 4,
    wherein said derivative is calculated as the difference between two subsequent sample values.

6. Method according to claim 4,
    wherein an additional criterion is established for when a peak is considered valid, including ensuring that the signal amplitude exceeds an absolute limit value selected from the range [0.005 uS, 0.03 uS].

7. Method according to claim 4,
    wherein an additional criterion is established for when a peak is considered valid, including ensuring that the increase in the skin conductance signal as a function of time remains below 20 uS/s.

8. Method according to claim 4,
    wherein an additional criterion is established for when a peak is considered valid, including ensuring that the absolute value of the change in the conductance signal from a local peak to a following local minimum exceeds a predetermined value selected from the range [0.005 uS, 0.03 uS].

9. Method according to claim 4,
    wherein an additional criterion is established for when a peak is considered valid, including ensuring that a starting point or an ending point of the time interval is not regarded as a valid peak.

10. Apparatus for establishing absence of pain in a mammal, comprising
    measurement equipment for providing a skin conductance signal measured at an area of the mammal's skin, and
    a control unit, configured to perform a method as set forth in one of the claims 1-9.

* * * * *